United States Patent [19]

Ichinohe et al.

[11] 4,433,125
[45] Feb. 21, 1984

[54] OXYGEN PERMEABLE HARD CONTACT LENS

[75] Inventors: Shoji Ichinohe, Annaka; Kouzou Takahashi, Aichi; Yasuharu Tanaka, Nagoya, all of Japan

[73] Assignees: Shin-Etsu Chemical Co., Ltd.; Toyo Contact Lens Co., Ltd., both of Japan

[21] Appl. No.: 459,981

[22] Filed: Jan. 21, 1983

[30] Foreign Application Priority Data

May 8, 1982 [JP] Japan .................................. 57-77133
Aug. 7, 1982 [JP] Japan ................................ 57-137597

[51] Int. Cl.³ ............................................. C08F 30/08
[52] U.S. Cl. .................................... 526/279; 523/107; 528/32; 351/160 R; 351/160 H
[58] Field of Search ......................... 526/279; 523/107; 528/32; 351/160 R, 160 H

[56] References Cited

U.S. PATENT DOCUMENTS 3,808,178  4/1974  Gaylord ............... 260/86.1
3,808,179  4/1974  Gaylord ............... 260/86.1
3,950,315  4/1976  Cleaver ............... 260/86.1
4,120,570  10/1978  Gaylord ............... 351/40
4,235,985  11/1980  Tanaka et al. ....... 526/279

*Primary Examiner*—Melvyn I. Marquis

*Attorney, Agent, or Firm*—Armstrong, Nikaido, Marmelstein & Kubovcik

[57] ABSTRACT

An oxygen permeable hard contact lens having an improved oxygen permeability and an improved fragility as well as excellent hardness and rigidity, made of a copolymer comprising an organosilane or organosiloxane having in one molecule at least one group of the general formula (I):

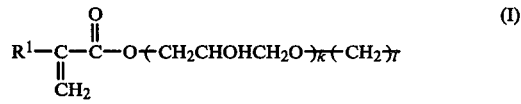

wherein $R^1$ is hydrogen atom or methyl group, k is 0 or 1, and l is 1 or 3, and having at most 16 silicon atoms, and a fluoroalkyl acrylate or methacrylate of the general formula (II):

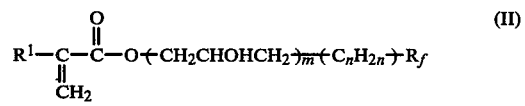

wherein $R^1$ is as defined above, m is 0 or 1, n is 0 or an integer of 1 to 3, and $R_f$ is a straight or branched fluoroalkyl group having 2 to 21 fluorine atoms.

7 Claims, No Drawings

OXYGEN PERMEABLE HARD CONTACT LENS

BACKGROUND OF THE INVENTION

The present invention relates to hard contact lenses having an excellent oxygen permeability.

Contact lenses put presently on the market are classified into two large groups, i.e. soft contact lenses made of a water-absorptive polymer such as poly(2-hydroxyethyl methacrylate) or a soft hydrophobic polymer such as silicone rubber, and hard contact lenses made of a hard polymer such as poly(methyl methacrylate). The hard contact lenses are generally inferior in wearing sensation to the soft contact lenses, but they have excellent visual power correcting effect and durability and also have the advantages peculiar to the hard contact lenses such as easiness in handling, and accordingly they are widely used at present.

Hard contact lenses have the fatal defect that it is difficult to supply oxygen required in metabolism of corneal tissue from the atmosphere to cornea through the lens materials, in other words, the oxygen permeability is bad. Consequently, wearing of the hard contact lenses for a long period of time causes metabolic trouble of the corneal tissue. In recent years, however, the above problem has been dissolved to some extent by the appearance of an oxygen permeable hard contact lens made of a copolymer of methyl methacrylate and a special methacrylate compound having siloxane bond (Si-O bond) in its molecule, and the hard contact lenses have rised in clinical estimation.

However, the proposed copolymer of the methacrylate compound having siloxane bond is inferior in hardness and rigidity to poly(methyl methacrylate) used as a material of usual hard contact lenses, and also is fragile. Lack of hardness and rigidity not only makes it easy to take scratches on the lens surface and makes it difficult to prepare contact lenses of a constant quality according to a predetermined lens contour, but also invites the fatal defect that a stable absolute visual power is not obtained due to difficulty in maintaining a constant lens contour upon wearing. On the other hand, the fragility results in lowering of the durability and rise in frequency of breaking as well as lowering of the mechanical processability. Accordingly, in order to obtain oxygen permeable hard contact lenses having an improved fragility as well as hardness and rigidity desired for hard contact lenses, the proportion of methyl methacrylate must be increased while decreasing the proportion of the siloxane bond-containing methacrylate compound to be used as a main component. But, this results in falling into the dilemma that the oxygen permeability of the obtained copolymer is decreased.

It is an object of the present invention to provide a hard contact lens having an improved oxygen permeability.

A further object of the invention is to provide an oxygen permeable hard contact lens having an improved fragility as well as excellent hardness and rigidity.

These and other objects of the present invention will become apparent from the description hereinafter.

SUMMARY OF THE INVENTION

It has now been found that the above-mentioned objects can be attained by employing as a contact lens material a copolymer comprising a silicon-containing acrylate or methacrylate and a fluoroalkyl acrylate or methacrylate.

In accordance with the present invention, there is provided an oxygen permeable hard contact lens made of a copolymer comprising (a) an organosilane or organosiloxane compound having in one molecule at least one group of the general formula (I):

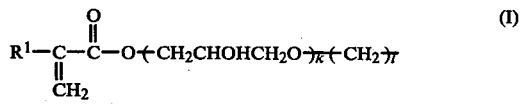

wherein $R^1$ is hydrogen atom or methyl group, k is 0 or 1, and l is 1 or 3, and having at most 16 silicon atoms, and (b) a compound of the general formula (II):

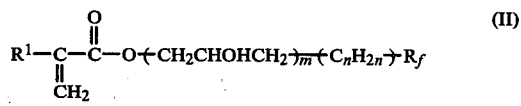

wherein $R^1$ is as defined above, m is 0 or 1, n is 0 or an integer of 1 to 3, and $R_f$ is a straight or branched fluoroalkyl group having 2 to 21 fluorine atoms.

DETAILED DESCRIPTION

The organosilane and organosiloxane compounds (hereinafter generically referred to as "Si—(M)A") used as a component (a) in the present invention include a compound of the general formula (III):

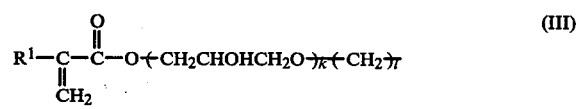

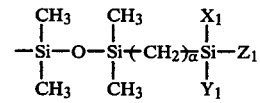

wherein $R^1$ is hydrogen atom or methyl group, k is 0 or 1, l is 1 or 3, $\alpha$ is 2 or 3, and $X_1$, $Y_1$ and $Z_1$ are the same or different and each is —$CH_3$ or —O—Si($CH_3$)$_3$, and a compound of the general formula (IV):

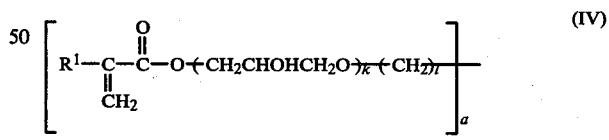

wherein $R^1$, k and l are as defined above, $R^2$, $R^3$ and $R^4$ are an alkyl group havng 1 to 3 carbon atoms, $0 < a < 4$, and $0 \leq b, C, d < 4$, provided $0 < a+b+c+d \leq 4$.

Preferable compounds (IV) are a compound of the general formula (V):

wherein R¹, k and l are as defined above, X₂, Y₂ and Z₂ are the same or different and each is

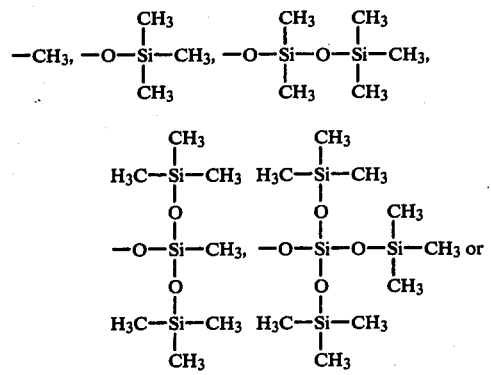

integer of 2 to 4,
and a compound of the general formula (VI)

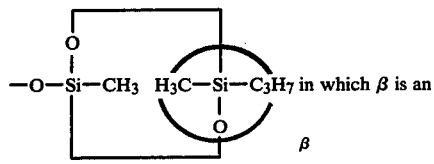                                                     (VI)

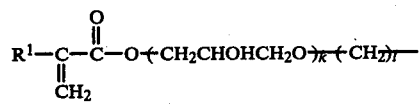

wherein R¹, k and l are as defined above, and γ is an integer of 2 to 4.

In the fluoroalkyl acrylate and methacrylate (II) (hereinafter generically referred to as "F—(M)A") used as a component (b) in the present invention, preferable substituent groups $R_f$ are a perfluoroalkyl group represented by the general formula (VII):

                                                     (VII)

wherein p is an integer of 1 to 10, and a fluoroalkyl group represented by the general formula (VIII):

                                                     (VIII)

wherein p is as defined above.

The Si—(M)A having a group of the general formula (I) in which R¹ is not hydrogen atom, but methyl group, namely the Si—(M)A having methacryloyloxy group, is preferably employed, since the hardness is large and also the heat resistance is good. Also, the Si—(M)A having the group (I) in which k is 0 rather than 1 provides a lens material having a higher oxygen permeability and a larger hardness, but is inferior in the copolymerizability with a hydrophilic monomer to the Si—(M)A having the group (I) in which k is 1. With respect to "l" in the general formula (I), the Si—(M)A having the group (I) in which l is 3 rather than 1 is chemically stable.

The Si—(M)A is an organosilane or organosiloxane compound having at most 16 silicon atoms, and has a straight, branched or cyclic silyl or siloxanyl group. The oxygen permeability is raised with increasing the number of silicon atoms, but simultaneously the product becomes soft and fragile. Therefore, the Si—(M)A having 4 to 10 silicon atoms is more preferable. The Si—(M)A having a branched or cyclic silyl or siloxanyl group is preferably used rather than the Si—(M)A having a straight silyl or siloxanyl group, because of providing a harder lens material. Also, the Si—(M)A having a siloxanyl group rather than silyl group is preferred, because of providing a lens material having a higher oxygen permeability.

With respect to the F—(M)A of the general formula (II), fluoroalkyl methacrylates are preferably employed, since the hardness is large and also the heat resistance is good as compared with fluoroalkyl acrylates. The F—(M)A of the general formula (II) in which m is 0 rather than 1 provides a lens material having a higher oxygen permeability and a larger hardness, but is inferior in the copolymerizability with a hydrophilic monomer to the F—(M)A (II) in which m is 1. Also, though "n" in the general formula (II) has no significant influence upon the physical properties of the product, the F—(M)A in which n is 0 or 1 is preferable, since the shorter the ($C_nH_{2n}$) group, the harder the product. The $R_f$ group is a straight or branched fluoroalkyl group having 2 to 21 fluorine atoms. The oxygen permeability is raised with increasing the number of the fluorine atoms in the $R_f$ group, but simultaneously the product becomes soft and fragile. Therefore, preferably the number of the fluorine atoms in the $R_f$ group is from 2 to 5. Also, the branched $R_f$ group is preferred than the straight $R_f$ group, since a harder product is obtained.

In both of the Si—(M)A and the F—(M)A, the methacrylate compounds are preferred than the acrylate compounds, since the products having a larger hardness and better light resistance and chemical resistance are obtained.

Examples of the Si—(M)A used in the present invention are, for instance, pentamethyldisiloxanylmethyl methacrylate, pentamethyldisiloxanylmethyl acrylate, pentamethyldisiloxanylpropyl methacrylate, pentamethyldisiloxanylpropyl acrylate, methylbis(trimethylsiloxy)silylpropyl methacrylate, methylbis(trimethylsiloxy)silylpropyl acrylate, tris(trimethylsiloxy)silylpropyl methacrylate, tris(trimethylsiloxy)silylpropyl acrylate, mono[methylbis(trimethylsiloxy)siloxy]bis(trimethylsiloxy)silylpropyl methacrylate, mono[methylbis(trimethylsiloxy)siloxy]bis(trimethylsiloxy)silylpropyl acrylate, tris[methylbis(trimethylsiloxy)siloxy]silylpropyl methacrylate, tris[methylbis(trimethylsiloxy)siloxy]silylpropyl acrylate, methylbis(trimethylsiloxy)silylpropylglycerol methacrylate, methylbis(trimethylsiloxy)silylpropylglycerol acrylate, tris(trimethylsiloxy)silylpropylglycerol methacrylate, tris(trimethylsiloxy)silylpropylglycerol acrylate, mono[methylbis(trimethylsiloxy)siloxy]bis(trimethylsiloxy)silylpropylglycerol methacrylate, mono[methylbis(trimethylsiloxy)siloxy]bis(trimethylsiloxy)silylpropylglycerol acrylate, trimethylsilylethyltetramethyldisiloxanylpropylglycerol methacrylate, trimethylsilylethyltetramethyldisiloxanylpropylglycerol acrylate, trimethylsilylmethyl methacrylate, trimethylsilylmethyl acrylate, trimethylsilylpropyl methacrylate, trimethylsilylpropyl acrylate, methylbis(trimethylsiloxy)-silylethyltetramethyldisiloxanylmethyl methacrylate, methylbis(trimethylsiloxy)silylethyltetramethyldisiloxanylmethyl acrylate, tetramethyltriisopropylcyclotetrasiloxanylpropyl methacrylate, tetramethyltriisopropylcyclotetrasiloxanylpropyl acrylate, tetramethylisopropylcyclotetrasiloxybis(trimethylsiloxy)-silylpropyl methacrylate, tetramethyltriisopropylcyclotetrasiloxybis(trimethylsiloxy)silylpropyl acrylate, and the like. The Si—(M)A monomers may be employed alone or in admixture thereof.

Examples of the F—(M)A used in the present invention are, for instance, 2,2,2-trifluoroethyl methacrylate, 2,2,2-trifluoroethyl acrylate, 2,2,3,3-tetrafluoropropyl methacrylate, 2,2,3,3-tetrafluoropropyl acrylate, 2,2,3,3,3-pentafluoropropyl methacrylate, 2,2,3,3,3-pentafluoropropyl acrylate, 2,2,2-trifluoro-1-trifluoromethylethyl methacrylate, 2,2,2-trifluoro-1-trifluoromethylethyl acrylate, 2,2,3,3-tetrafluoro-t-amyl methacrylate, 2,2,3,3-tetrafluoro-t-amyl acrylate, 2,2,3,4,4,4-hexafluorobutyl methacrylate, 2,2,3,4,4,4-hexafluorobutyl acrylate, 2,2,3,4,4,4-hexafluoro-t-hexyl methacrylate, 2,2,3,4,4,4-hexafluoro-t-hexyl acrylate, 2,2,3,3,4,4,5,5-octafluoropentyl methacrylate, 2,2,3,3,4,4,5,5-octafluoropentyl acrylate, 2,3,4,5,5,5-hexafluoro-2,4-bis(trifluoromethyl)pentyl methacrylate, 2,3,4,5,5,5-hexafluoro-2,4-bis(trifluoromethyl)pentyl acrylate, 2,2,3,3,4,4,5,5,6,6,7,7-dodecafluoropentyl methacrylate, 2,2,3,3,4,4,5,5,6,6,7,7-dodecafluoropentyl acrylate, 2-hydroxy-4,4,5,5,6,7,7,7-octafluoro-6-trifluoromethylheptyl methacrylate, 2-hydroxy-4,4,5,5,6,7,7-octafluoro-6-trifluoromethylheptyl acrylate, 2-hydroxy-4,4,5,5,6,6,7,7,8,9,9,9-dodecafluoro-8-trifluoromethylnonyl methacrylate, 2-hydroxy-4,4,5,5,6,6,7,7,8,9,9,9-dodecafluoro-8-trifluoromethylnonyl acrylate, 2-hydroxy-4,4,5,5,6,6,7,7,8,8,9,9,10,11,11,11-hexadecafluoro-10-trifluoromethylundecyl methacrylate, 2-hydroxy-4,4,5,5,6,6,7,7,8,8,9,9,10,11,11,11-hexadecafluoro-10-trifluoromethylundecyl acrylate, and the like. The F—(M)A monomers may be employed alone or in admixture thereof.

Copolymers having particularly excellent oxygen permeability, hardness and rigidity can be obtained, when there is employed as Si—(M)A tris(trimethylsiloxy)silylpropyl methacrylate of the formula (IX):

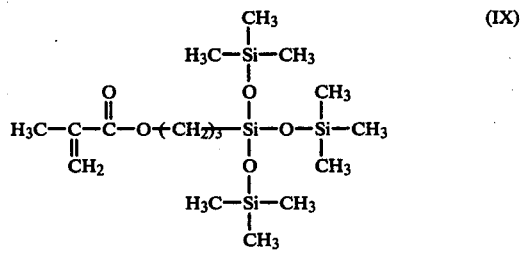

pentamethyldisiloxanylpropyl methacrylate of the formula (X):

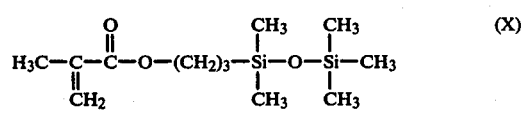

or methylbis(trimethylsiloxy)silylpropyl methacrylate of the formula (XI):

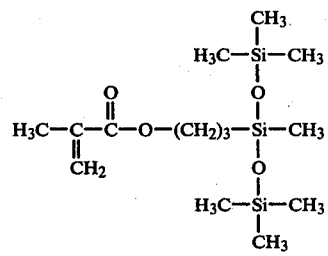

and there is employed as F—(M)A 2,2,2-trifluoroethyl methacrylate of the formula (XII):

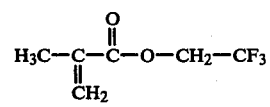

2,2,3,3-tetrafluoropropyl methacrylate of the formula (XIII):

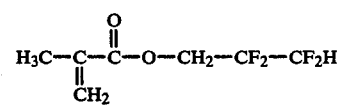

2,2,3,3,3-pentafluoropropyl methacrylate of the formula (XIV):

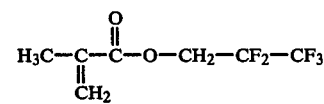

or 2,2,2-trifluoro-1-trifluoromethylethyl methacrylate of the formula (XV):

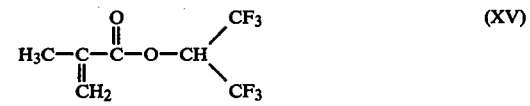

The F—(M)A used in the present invention can provide a lens material having a higher oxygen permeability by the copolymerization with the Si—(M)A as compared with the use of other acrylic monomers such as alkyl acrylates and methacrylates which have a similar chemical structures to the F—(M)A, whereby it is possible to impart a high oxygen permeability and desired hardness and rigidity to the produced copolymer without extremely increasing the amount of the Si—(M)A to be used. Also, the heat resistance and the chemical resistance such as resistance to n-hexane (nonpolar solvent), ethyl alcohol (polar solvent) and acetone (amphiprotic solvent) are improved by the use of the F—(M)A as compared with the use of alkyl methacrylates or acrylates.

The ratio of the Si—(M)A to the F—(M)A which are main components of the copolymer in the present invention is from about 15:85 to about 80:20 by weight, preferably from about 30:70 to about 70:30 by weight. When the amount of the Si—(M)A used is more than the above range, the produced copolymer is soft and fragile, thus resulting in lowering of the mechanical processability, and also the chemical resistance is lowered. When the amount of the Si—(M)A is less than the above range, a sufficient oxygen permeability is not imparted to the produced copolymer.

In addition to the essential monomer components, i.e. Si—(M)A and F—(M)A, various monomers may be employed as comonomers in order to modify the properties of the copolymer according to various purposes.

Alkyl acrylates and methacrylates are effective particularly for increasing the strength of the copolymer, thereby raising the durability as a contact lens. Representative examples of the alkyl methacrylates and acrylates are, for instance, methyl methacrylate, methyl acrylate, ethyl methacrylate, ethyl acrylate, isopropyl methacrylate, isopropyl acrylate, t-butyl methacrylate, t-butyl acrylate, isobutyl methacrylate, isobutyl acrylate, t-amyl methacrylate, t-amyl acrylate, 2-ethylhexyl methacrylate, 2-ethylhexyl acrylate, lauryl methacrylate, lauryl acrylate, cyclohexyl methacrylate, cyclohexyl acrylate, and the like. The alkyl methacrylates and acrylates may be employed alone or in admixture thereof. The amount of the alkyl acrylate or the alkyl methacrylate is selected from 0 to about 60 parts by weight, preferably about 5 to about 30 parts by weight, based on 100 parts by weight of the whole monomer mixture to be subjected to the copolymerization.

As monomers having the same effects as the alkyl acrylates and methacrylates, there may also be employed styryl compounds such as styrene, alkyl esters of itaconic acid or crotonic acid, glycidyl methacrylate, glycidyl acrylate, tetrahydrofurfuryl methacrylate, tetrahydrofurfuryl acrylate and benzyl methacrylate. The amount of these monomers is selected from the same range as that of the alkyl acrylate or methacrylate.

The use of a cross-linking monomer is effective for stabilizing the lens contour and dimension and for increasing the chemical resistance. Representative examples of the cross-linking monomer are, for instance, ethylene glycol dimethacrylate, ethylene glycol diacrylate, diethylene glycol dimethacrylate, diethylene glycol diacrylate, allyl methacrylate, allyl acrylate, trimethylolpropane trimethacrylate, trimethylolpropane triacrylate, and the like. The cross-linking monomers may be employed alone or in admixture thereof. The amount of the cross-linking monomer is selected from 0 to about 20 parts by weight, preferably about 1 to about 10 parts by weight, based on 100 parts by weight of the whole monomer mixture to be subjected to the copolymerization.

The use of a hydrophilic monomer is effective for imparting a hydrophilic property to the obtained copolymer and for giving a good water wettability to a hard contact lens. Representative examples of the hydrophilic monomer are, for instance, 2-hydroxyethyl methacrylate, 2-hydroxyethyl acrylate, N-vinyl pyrrolidone, dimethylacrylamide, and the like. The hydrophilic monomers may be employed alone or in admixture thereof. The amount of the hydrophilic monomer is selected from 0 to about 30 parts by weight, preferably about 5 to about 15 parts by weight, based on 100 parts by weight of the whole monomer mixture to be subjected to the copolymerization. The use of the hydrophilic monomer in an amount larger than the above range is not desirable, since the obtained copolymer becomes water-absorptive and shows a flexibility due to plasticization by impregnated water, thereby losing the characteristics as hard contact lenses.

It is also possible to impart an effective hydrophilic property to the lens surface, for instance, by applying corona discharge or plasma discharge to the obtained hard contact lens or by treating the lens with a strong acid such as hydrochloric acid or nitric acid, instead of or in addition to the use of a hydrophilic monomer.

The polymerization of a monomer mixture can be readily carried out by any methods usually employed in the field of this art. For instance, the polymerization is carried out at a temperature ranging from room temperature to about 130° C. by employing free radical polymerization initiators as used in the polymerization of usual unsaturated hydrocarbon compounds. Examples of the radical polymerization initiator are, for instance, benzoyl peroxide, azobisisobutyronitrile, azobisdimethylvaleronitrile, and the like. The polymerization initiators may be employed alone or in admixture thereof. The polymerization initiator is employed in an amount of 0.01 to 1 part by weight per 100 parts by weight of the whole monomer mixture.

The shaping of the copolymer into contact lenses can be made by usual methods. For instance, polymerization may be conducted in a mold corresponding to a shape of a contact lens to give a copolymer having a contact lens shape directly. The thus obtained contact lens may be further subjected to a mechanical finishing, as occasion demands. Also, the polymerization may be conducted in an appropriate mold or vessel to give a lens material in the form of button, plate or rod, and the lens material may be then subjected to a usual mechanical processing such as cutting or polishing to give a contact lens of a desired shape.

The oxygen permeable contact lens of the present invention has the following excellent properties. That is to say, since the lens is made of a material having an improved fragility as well as hardness and rigidity desired for hard contact lenses, the lens has an improved durability and also it is possible to maintain a constant lens contour, whereby a stable corrected visual power can be obtained. Also, since the hard contact lens of the present invention has a higher oxygen permeability than a conventional oxygen permeable hard contact lens, it is possible to sufficiently maintain the metabolism of the corneal tissue even if the lenses are worn for a long period of time.

The present invention is more specifically described and explained by means of the following Examples in which all parts are by weight unless otherwise noted. It is to be understood that the present invention is not limited to the Examples, and various changes and modifications may be made in the invention without departing from the spirit and scope thereof.

In the Examples, physical properties of contact lenses were measured according to the following methods.

(1) Oxygen permeability ($cc.cm./cm.^2sec.mmHg$) is measured at 35° C. in 0.9% physiological saline by a film-oxygen gas permeameter of a Seikaken type made by Rikaseiki Kogyo Kabushiki Kaisha with respect to a specimen having a diameter of 12.7 mm. and a thickness of 0.2 mm.

(2) Vickers hardness (7.5 NHv) is measured in an air-conditioned room of 20° C. and 45%RH by a hardness tester made by Kabushiki Kaisha Akashi Seisakusho with respect to a specimen having a diameter of 12.7 mm. and a thickness of 4.0 mm.

(3) Refractive index ($n_D^{20}$) is measured in an air-conditioned room of 20° C. and 45%RH by an Erma new type Abbe's refractometer made by Erma Optical Works Co., Ltd. with respect to a specimen having a diameter of 12.7 mm. and a thickness of 4.0 mm.

(4) Specific gravity ($d^{20}$) is measured in a distilled water of 20° C. by employing a Mettler directreading balance with respect to a specimen having a diameter of 12.7 mm. and a thickness of 4.0 mm.

(5) Visible ray percent transmission (%) is measured in a distilled water of 20° C. by Automatic Recording Spectrophotometer UV-240 made by Shimadzu Corporation with respect to a specimen having a diameter of 12.7 mm. and a thickness of 0.50 mm.

EXAMPLE 1

There were thoroughly admixed 34 parts of tris(-trimethylsiloxy)silylpropyl methacrylate, 60 parts of 2,2,2-trifluoroethyl methacrylate, 6 parts of ethylene glycol dimethacrylate and 0.15 part of 2,2'-azobis(2,4-dimethylvaleronitrile) (hereinafter referred to as "ABDVN") as a polymerization initiator. The mixture was placed in a glass test tube, and after stoppering the test tube, the polymerization was stepwise carried out in a circulating thermostat at 35° C. for 41.5 hours and in a circulating dryer at 50° C. for 6 hours, at 60° C. for 1.5 hours, at 70° C. for 1.5 hours, at 80° C. for 1.5 hours, at 90° C. for 1 hour, at 100° C. for 1 hour and at 110° C. for 1 hour. The obtained colorless transparent copolymer was cut and subjected to mechanical processing such as grinding and polishing to give a hard contact lens.

Physical properties of the lens were measured. The results are shown in Table 1. Physical properties of a conventional oxygen permeable hard contact lens (commercially available under the commercial name "Menicon $O_2$" made by Toyo Contact Lens Co., Ltd.) are also shown in Table 1 for comparison.

TABLE 1

|  | Example 1 | Menicon $O_2$ |
| --- | --- | --- |
| Oxygen permeability | $4.27 \times 10^{-10}$ | $1.05 \times 10^{-10}$ |
| Vickers hardness | 8.7 | 8.6 |
| Refractive index | 1.427 | 1.481 |
| Specific gravity | 1.23 | 1.125 |
| Visible ray percent transmission | >98 | >98 |

The contact lenses obtained in this Example were continuously worn on each of the right eyes of 3 albino rabbits for 21 days. No change was observed on the corneal surfaces and also no decrease of glycogen was observed. Further, in respect of the histological observation, there was no vascularization, substantial edema and infiltration of inflammatory cells, and no morphologically significant change was observed between the right eye and the comparative left eye. Thus, the contact lens had an excellent wearability.

It would be understood from the above results that hard contact lens prepared in this Example has a far higher oxygen permeability than the conventional contact lens as well as desirable hardness and rigidity, and also the durability and safety as a contact lens are sufficiently satisfactory.

EXAMPLES 2 AND 3

The procedures of Example 1 were repeated except that the respective components used in Example 1 were used in amounts shown in Table 2 to give hard contact lenses.

The results of the measurement of physical properties of the obtained lenses are shown in Table 2.

TABLE 2

|  | Ex. 2 | Ex. 3 |
| --- | --- | --- |
| Components (part) | | |
| Tris(trimethylsiloxy)silylpropyl methacrylate | 24 | 74 |
| 2,2,2-Trifluoroethyl methacrylate | 70 | 20 |
| Ethylene glycol dimethacrylate | 6 | 6 |
| ABDVN | 0.12 | 0.27 |
| Physical properties | | |
| Oxygen permeability | $3.26 \times 10^{-10}$ | $7.42 \times 10^{-10}$ |
| Vickers hardness | 10.6 | 3.3 |
| Visible ray percent transmission | >98 | >98 |

COMPARATIVE EXAMPLES 1 TO 3

The procedures of Examples 1 to 3 were repeated except that 2,2,2-trifluoroethyl methacrylate in each Example was replaced with ethyl methacrylate which had a similar structure to the trifluoroethyl methacrylate, so as to correspond to Examples 1 to 3.

The results of the measurement of physical properties of the obtained contact lenses are shown in Table 3.

TABLE 3

|  | Com. Ex. 1 | Com. Ex. 2 | Com. Ex. 3 |
| --- | --- | --- | --- |
| Components (part) | | | |
| Tris(trimethylsiloxy)silylpropyl methacrylate | 34 | 24 | 74 |
| Ethyl methacrylate | 60 | 70 | 20 |
| Ethylene glycol dimethacrylate | 6 | 6 | 6 |
| ABDVN | 0.15 | 0.12 | 0.27 |
| Physical properties | | | |
| Oxygen permeability | $2.22 \times 10^{-10}$ | $1.45 \times 10^{-10}$ | $5.72 \times 10^{-10}$ |
| Vickers hardness | 8.6 | 9.6 | 3.7 |
| Visible ray percent transmission | >98 | >98 | >98 |

As is clear from comparison between Examples 1 to 3 and Comparative Examples 1 to 3, the hard contact lenses of Examples 1 to 3 obtained by using 2,2,2-trifluoroethyl methacrylate have a far higher oxygen permeability than the hard contact lenses of Comparative Examples 1 to 3 obtained by using an equal amount of ethyl methacrylate instead of the trifluoroethyl methacrylate, while maintaining the same degree of Vickers hardness.

EXAMPLES 4 TO 15

The procedures of Example 1 were repeated except that the kinds and amounts of components in the polymerization were changed as shown in Table 4.

The physical properties of the obtained contact lenses are shown in Table 4.

TABLE 4

| Ex. No. | 4 | 5 | 6 | 7 | 8 | 9 | 10 | 11 | 12 | 13 | 14 | 15 |
| --- | --- | --- | --- | --- | --- | --- | --- | --- | --- | --- | --- | --- |
| Components (part) | | | | | | | | | | | | |
| Tris(trimethylsiloxy)silylpropyl methacrylate | 50 | 40 | 45 | 45 | 45 | 45 | 45 | 45 | 45 | 55 | 55 | 16.8 |
| 2,2,2-Trifluoroethyl methacrylate | 50 | 50 | 25 | 25 | 25 | 25 | 25 | 25 | 25 | 30 | 30 | 70 |
| Ethyl methacrylate | — | — | 25 | — | — | — | — | — | — | — | — | — |
| Isopropyl methacrylate | — | — | — | 25 | — | — | — | — | — | — | — | — |

TABLE 4-continued

| Ex. No. | 4 | 5 | 6 | 7 | 8 | 9 | 10 | 11 | 12 | 13 | 14 | 15 |
|---|---|---|---|---|---|---|---|---|---|---|---|---|
| t-Butyl methacrylate | — | — | — | — | 25 | — | — | — | — | — | — | — |
| Cyclohexyl methacrylate | — | — | — | — | — | 25 | — | — | — | — | — | — |
| Tetrahydrofurfuryl methacrylate | — | — | — | — | — | — | 25 | — | — | — | — | — |
| Benzyl methacrylate | — | — | — | — | — | — | — | 25 | — | — | — | — |
| Styrene | — | — | — | — | — | — | — | — | 25 | — | — | — |
| Methyl methacrylate | — | — | — | — | — | — | — | — | — | — | — | 7.2 |
| 2-Hydroxyethyl methacrylate | — | — | — | — | — | — | — | — | — | 10 | — | — |
| N—Vinyl pyrrolidone | — | — | — | — | — | — | — | — | — | — | 10 | — |
| Ethylene glycol dimethacrylate | — | 10 | — | — | — | — | — | 5 | 3 | 5 | 5 | 6 |
| Trimethylolpropane trimethacrylate | — | — | 5 | 5 | 5 | — | — | — | 2 | — | — | — |
| Allyl methacrylate | — | — | — | — | — | 5 | 5 | — | — | — | — | — |
| ABDVN | 0.20 | 0.17 | 0.18 | 0.18 | 0.18 | 0.18 | 0.18 | 0.18 | 0.18 | 0.22 | 0.22 | 0.09 |
| Physical properties | | | | | | | | | | | | |
| Oxygen permeability ($\times 10^{-10}$) | 6.34 | 5.29 | 4.63 | 4.70 | 5.12 | 4.21 | 4.16 | 4.69 | 3.97 | 5.14 | 5.30 | 2.48 |
| Vickers hardness | 4.4 | 8.9 | 7.3 | 7.7 | 7.5 | 5.4 | 4.4 | 6.1 | 7.8 | 6.9 | 6.6 | 12.7 |
| Visible ray percent transmission | >98 | >98 | >98 | >98 | >98 | >98 | >98 | >98 | >98 | >98 | >98 | >98 |

EXAMPLES 16 TO 50

The procedures of Example 1 were repeated except that the kinds and amounts of components in the polymerization were changed as shown in Table 5.

The physical properties of the obtained contact lenses are shown in Table 5.

The organosilane and organosiloxane compounds S1 to S15 and the fluoroalkyl methacrylates and acrylates F1 to F16 shown in Table 5 are as follows:

S1: Tris(trimethylsiloxy)silylpropyl methacrylate
S2: Pentamethyldisiloxanylmethyl methacrylate
S3: Methylbis(trimethylsiloxy)silylpropyl methacrylate
S4: Mono[methylbis(trimethylsiloxy)siloxy]bis(trimethyl-siloxy)silylpropyl methacrylate
S5: Tris[methylbis(trimethylsiloxy)siloxy]silylpropyl methacrylate
S6: Methylbis(trimethylsiloxy)silylpropylglycerol methacrylate
S7: Tris(trimethylsiloxy)silylpropylglycerol methacrylate
S8: Mono[methylbis(trimethylsiloxy)siloxy]bis(trimethylsiloxy)silylpropylglycerol methacrylate
S9: Methylbis(trimethylsiloxy)silylpropylglycerol acrylate
S10: Trimethylsilylethyltetramethyldisiloxanylpropylglycerol methacrylate
S11: Trimethylsilylmethyl methacrylate
S12: Trimethylsilylpropyl methacrylate
S13: Methylbis(trimethylsiloxy)silylethyltetramethyldisiloxanylmethyl methacrylate
S14: Tetramethyltriisopropylcyclotetrasiloxanylpropyl methacrylate
S15: Tetramethyltriisopropylcyclotetrasiloxybis(trimethylsiloxy)silylpropyl methacrylate
F1: 2,2,2-Trifluoroethyl methacrylate
F2: 2,3,4,5,5,5-Hexafluoro-2,4-bis(trifluoromethyl)pentyl methacrylate
F3: 2,2,3,3-Tetrafluoropropyl methacrylate
F4: 2,2,3,3-Tetrafluoro-t-amyl methacrylate
F5: 2,2,3,4,4,4-Hexafluorobutyl methacrylate
F6: 2,2,3,4,4,4-Hexafluoro-t-hexyl methacrylate
F7: 2,2,3,3,4,4,5,5-Octafluoropentyl methacrylate
F8: 2,3,4,5,5,5-Hexafluoro-2,4-bis(trifluoromethyl)pentyl methacrylate
F9: 2,2,3,3,4,4,5,5,6,6,7,7-Dodecafluoropentyl methacrylate
F10: 2-Hydroxy-4,4,5,5,6,7,7,7-octafluoro-6-trifluoromethylheptyl methacrylate
F11: 2-Hydroxy-4,4,5,5,6,6,7,7,8,9,9,9-dodecafluoro-8-trifluoromethylnonyl methacrylate
F12: 2-Hydroxy-4,4,5,5,6,6,7,7,8,8,9,9,10,11,11,11-hexadecafluoro-10-trifluoromethylundecyl methacrylate
F13: 2,2,3,3-Tetrafluoropropyl acrylate
F14: 2,2,3,3,4,4,5,5-Octafluoropentyl acrylate
F15: 2-Hydroxy-4,4,5,5,6,6,7,7,8,9,9,9-dodecafluoro-8-trifluoromethylnonyl acrylate
F16: 2-Hydroxy-4,4,5,5,6,6,7,7,8,8,9,9,10,11,11,11-hexadecafluoro-10-trifluoromethylundecyl acrylate

TABLE 5

| Ex. No. | 16 | 17 | 18 | 19 | 20 | 21 | 22 | 23 | 24 | 25 | 26 | 27 | 28 |
|---|---|---|---|---|---|---|---|---|---|---|---|---|---|
| Components (part) | | | | | | | | | | | | | |
| Si-(M)A | S1 64 | S1 54 | S1 44 | S2 30 | S3 30 | S1 30 | S4 30 | S5 30 | S6 30 | S7 30 | S8 30 | S9 30 | S10 30 |
| F-(M)A | F1 30 | F1 40 | F1 50 | F1 50 | F1 50 | F1 50 | F1 50 | F1 50 | F1 50 | F1 50 | F1 50 | F1 50 | F1 50 |
| Methyl methacrylate | — | — | — | 12 | 12 | 12 | 12 | 12 | 12 | 12 | 12 | 12 | 12 |
| Ethylene gylcol dimethacrylate | 6 | 6 | 6 | 8 | 8 | 8 | 8 | 8 | 8 | 8 | 8 | 8 | 8 |
| ABDVN | 0.24 | 0.21 | 0.18 | 0.15 | 0.15 | 0.15 | 0.15 | 0.15 | 0.15 | 0.15 | 0.15 | 0.15 | 0.15 |
| Physical properties | | | | | | | | | | | | | |
| Oxygen permeability ($\times 10^{-10}$) | 6.59 | 6.03 | 5.33 | 2.15 | 2.57 | 3.76 | 3.93 | 4.47 | 1.59 | 2.29 | 2.57 | 1.68 | 1.58 |
| Vickers hardness | 4.9 | 5.9 | 7.3 | 11.0 | 10.1 | 11.2 | 10.2 | 9.5 | 11.2 | 11.6 | 9.1 | 8.2 | 5.0 |
| Visible ray percent transmission | >98 | >98 | >98 | >98 | >98 | >98 | >98 | >98 | >98 | >98 | >98 | >98 | >98 |
| Ex. No. | 29 | 30 | 31 | 32 | 33 | 34 | 35 | 36 | 37 | 38 | 39 | 40 | 41 |
| Components (part) | | | | | | | | | | | | | |
| Si-(M)A | S11 30 | S12 30 | S13 30 | S14 30 | S15 30 | S7 30 | S12 30 | S1 40 | S1 40 | S1 40 | S1 40 | S1 40 | S1 40 |
| F-(M)A | F1 50 | F1 50 | F1 50 | F1 50 | F1 50 | F2 40 | F2 40 | F1 30 | F3 30 | F4 30 | F5 30 | F6 30 | F7 30 |
| Methyl methacrylate | 12 | 12 | 12 | 12 | 12 | 22 | 22 | 22 | 22 | 22 | 22 | 22 | 22 |
| Ethylene glycol dimethacrylate | 8 | 8 | 8 | 8 | 8 | 8 | 8 | 8 | 8 | 8 | 8 | 8 | 8 |

TABLE 5-continued

| ABDVN | 0.15 | 0.15 | 0.15 | 0.15 | 0.15 | 0.15 | 0.15 | 0.20 | 0.20 | 0.20 | 0.20 | 0.20 | 0.20 |
|---|---|---|---|---|---|---|---|---|---|---|---|---|---|
| Physical properties | | | | | | | | | | | | | |
| Oxygen permeability ($\times 10^{-10}$) | 1.20 | 1.31 | 3.21 | 2.04 | 2.04 | 2.49 | 1.28 | 3.86 | 3.43 | 3.01 | 3.73 | 3.79 | 3.37 |
| Vickers hardness | 16.7 | 14.2 | 7.3 | 8.3 | 8.3 | 11.4 | 13.9 | 10.8 | 10.0 | 12.1 | 9.1 | 11.3 | 8.8 |
| Visible ray percent transmission | >98 | >98 | >98 | >98 | >98 | >98 | >98 | >98 | >98 | >98 | >98 | >98 | >98 |

| | Ex. No. | 42 | 43 | 44 | 45 | 46 | 47 | 48 | 49 | 50 |
|---|---|---|---|---|---|---|---|---|---|---|
| | Components (part) | | | | | | | | | |
| | Si-(M)A | S1 40 | S1 40 | S1 40 | S1 40 | S1 40 | S1 40 | S1 40 | S1 40 | S1 40 |
| | F-(M)A | F8 30 | F9 30 | F10 30 | F11 30 | F12 30 | F13 30 | F14 30 | F15 30 | F16 30 |
| | Methyl methacrylate | 22 | 22 | 22 | 22 | 22 | 22 | 22 | 22 | 22 |
| | Ethylene glycol dimethacrylate | 8 | 8 | 8 | 8 | 8 | 8 | 8 | 8 | 8 |
| | ABDVN | 0.20 | 0.20 | 0.20 | 0.20 | 0.20 | 0.20 | 0.20 | 0.20 | 0.20 |
| | Physical properties | | | | | | | | | |
| | Oxygen permeability ($\times 10^{-10}$) | 4.23 | 3.74 | 4.10 | 4.18 | 5.02 | 2.95 | 3.68 | 4.15 | 4.94 |
| | Vickers hardness | 9.7 | 8.5 | 9.4 | 8.2 | 8.4 | 5.8 | 6.8 | 7.4 | 7.7 |
| | Visible ray percent transmission | >98 | >98 | >98 | >98 | >98 | >98 | >98 | >98 | >98 |

In addition to the ingredients used in the Examples, other ingredients can be used in the Examples as set forth in the specification to obtain substantially the same results.

What we claim is:

1. An oxygen permeable hard contact lens made of a copolymer comprising (a) an organosilane or organosiloxane compound having in one molecule at least one group of the general formula (I):

(I)

wherein $R^1$ is hydrogen atom or methyl group, k is 0 or 1, and $l$ is 1 or 3,
and having at most 16 silicon atoms, and (b) a compound of the general formula (II):

(II)

wherein $R^1$ is as defined above, m is 0 or 1, n is 0 or an integer of 1 to 3, and $R_f$ is a straight or branched fluoroalkyl group having 2 to 21 fluorine atoms.

2. The contact lens of claim 1, wherein the organosiloxane is a compound of the general formula (III):

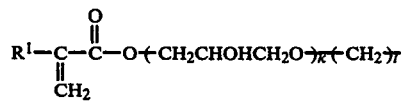
(III)

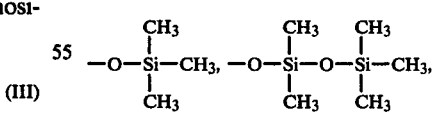

wherein $R^1$ is hydrogen atom or methyl group, k is 0 or 1, $l$ is 1 or 3, $X_1$, $Y_1$ and $Z_1$ are the same or different and each is —$CH_3$ or —O—$Si(CH_3)_3$, and $\alpha$ is 2 or 3.

3. The contact lens of claim 1, wherein the organosilane or organosiloxane is a compound of the general formula (IV):

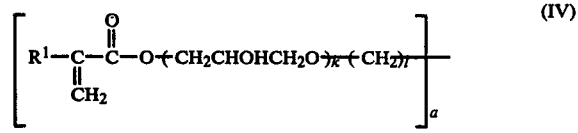
(IV)

wherein $R^1$ is hydrogen atom or methyl group, k is 0 or 1, $l$ is 1 or 3, $R^2$, $R^3$ and $R^4$ are an alkyl group having 1 to 3 carbon atoms, $0 < a < 4$, and $0 \leq b$, c, $d < 4$, provided $0 < a+b+c+d \leq 4$.

4. The contact lens of claim 3, wherein the compound (IV) is a compound of the general formula (V):

(V)

wherein $R^1$ is hydrogen atom or methyl group, k is 0 or 1, $l$ is 1 or 3, and $X_2$, $Y_2$ and $Z_2$ are the same or different and each is —$CH_3$,

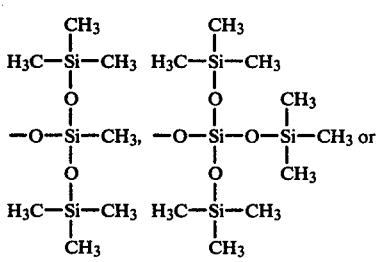

-continued

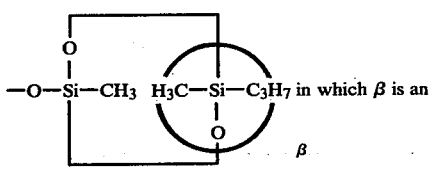

in which $\beta$ is an integer of 2 to 4.

5. The contact lens of claim 3, wherein the compound (IV) is a compound of the general formula (VI):

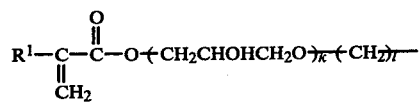
(VI)

-continued

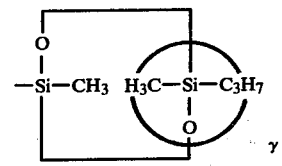
$\gamma$ wherein $R^1$ is hydrogen atom or methyl group, k is 0 or 1, $l$ is 1 or 3 and $\gamma$ is an integer of 2 to 4.

6. The contact lens of claim 1, wherein said $R_f$ is a perfluoroalkyl group of the general formula (VII):

$$-C_pF_{2p+1} \qquad (VII)$$

wherein p is an integer of 1 to 10.

7. The contact lens of claim 1, wherein said $R_f$ is a fluoroalkyl group of the general formula (VIII):

$$-C_pF_{2p}H \qquad (VIII)$$

wherein p is an integer of 1 to 10.

* * * * *

UNITED STATES PATENT AND TRADEMARK OFFICE
CERTIFICATE OF CORRECTION

PATENT NO. : 4,433,125
DATED : February 21, 1984
INVENTOR(S) : SHOJI ICHINOHE ET AL It is certified that error appears in the above-identified patent and that said Letters Patent is hereby corrected as shown below:

On the cover page, in the Abstract, line 9, change "and 1 is" to --- and $\ell$ is ---.

Column 2, line 59, change "b, C, d" to --- b, c, d ---.

Signed and Sealed this

Twentieth Day of August 1985

[SEAL]

*Attest:*

DONALD J. QUIGG

*Attesting Officer*     *Acting Commissioner of Patents and Trademarks*